May 29, 1945.  W. M. CASE  2,376,900
SPEED REDUCTION GEAR MECHANISM
Filed Jan. 26, 1943
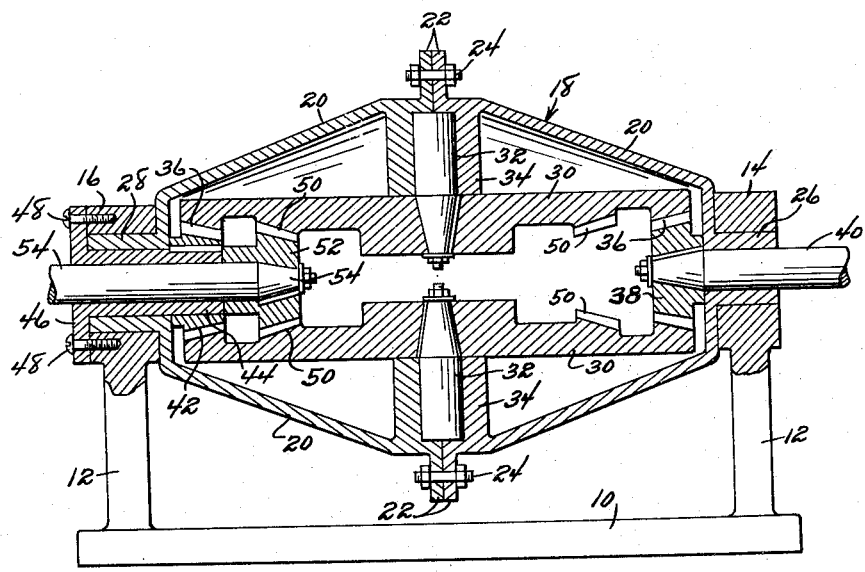
Willard M. Case  INVENTOR.
BY
Victor J. Evans & Co.
ATTORNEYS Patented May 29, 1945

2,376,900

UNITED STATES PATENT OFFICE 2,376,900

SPEED REDUCTION GEAR MECHANISM

Willard M. Case, Shelter Island Heights, N. Y.

Application January 26, 1943, Serial No. 473,643

5 Claims. (Cl. 74—303)

My invention relates to speed reduction gear mechanism in the nature of couplings for transmitting power between drive and driven members, and has among its objects and advantages the provision of a novel gear mechanism which may be employed for connecting a drive shaft and a driven shaft and operating in such manner as to render the driven shaft non-reversing by torque applied thereto.

The drawing illustrates a sectional view of a gear mechanism in accordance with my invention.

In the embodiment selected for illustration, I make use of a fixed base 10 having posts 12, respectively provided with coaxial bearings 14 and 16. Between the bearings 14 and 16 is arranged a gear housing 18 made up of two sections 20. These sections are provided with abutting flanges 22 having face to face engagement and secured into a unitary structure by bolts 24. Coaxial sleeve shafts 26 and 28 are formed on the sections 20 and rotatably supported in the bearings 14 and 16, respectively.

Inside the housing 18 is arranged two gear members 30, each attached to a shaft 32 rotatably supported in a bearing 34 comprising semicircular formations on the respective sections 20. The shafts 32 are coaxially arranged at right angles to the common axis of the bearings 14 and 16.

Each member 30 is provided with a first bevel gear 36 meshing with a pinion 38 keyed to a drive shaft 40 rotatably supported in the sleeve 26. The gears 36 are also in mesh with a pinion 42 keyed to a sleeve 44 on which the sleeve bearing 28 is rotatably mounted. A flange 46 is formed on the sleeve 44, which flange is fixedly secured to the bearing 16 by bolts 48. An equal number of teeth is provided in the gears 36, which is also true of the pinions 38 and 42.

Each member 30 is also provided with a second bevel gear 50 of smaller diameter than its gear 36, the two gears 50 meshing with a pinion 52 attached to the driven shaft 54, the latter being rotatably supported in the sleeve 44. The pinion 52 contains fewer teeth than the pinions 38 and 42.

In operation, should the gears 36 each contain sixty teeth and the meshing gear 42 contain fifteen teeth, the ratio would be 4 to 1. Should the gears 50 each contain forty-eight teeth and the meshing gear 52 contain twelve, the ratio would also be 4 to 1. With such common ratios, rotation of the drive shaft 40 will cause the housing 18 to turn in the direction of rotation of the drive shaft, since the gears 36 will rotate reversely of each other and roll about the fixed gear 42.

With the tooth ratio of the gear 52 and the gears 50 the same as with respect to the gear 42 and the gears 36, the gear 42 and the shaft 54 will remain stationary. This being true, the shaft would be one hundred per cent resistant to any turning torque that may be applied to the gear, since the fixed gear causes the gears 36 to attempt movement directly opposed to the applied torque on the shaft 54. On the basis of the foregoing ratios, the gear 42 and the shaft 54 are in the nature of an integral unit.

Instead of employing forty-eight-teeth in the gears 50, for example, the teeth are increased to forty-nine or more with all the other gears remaining of the sizes set forth in the foregoing example. Thus when the shaft 40 is turned, the gear 52 will be forced to turn slowly in the desired direction of rotation, which is reversed to the housing 18. Such construction renders the output or driven shaft 54 non-recoiling, that is will lock the mechanism to preclude rotation of the output shaft in a reverse direction by torque applied to the driven shaft. Should the teeth of the gears 50 be reduced less than forty-eight, the shaft 54 would drag in the direction of rotation of the housing 18. The opposite takes place through increasing the teeth in the gears 50, which forces the shaft 54 to turn reversely of the direction of rotation of the housing 18, which is the desired result for rendering the non-recoiling feature operative.

In addition to the non-recoiling feature, the present invention provides a coupling characterized by a relatively large speed reduction between the drive and driven shafts which renders the mechanism suitable for direct connection with an electric motor. All the gears are enclosed in the housing 18 and the latter may be supplied with lubricant so as to effectively lubricate all moving parts. The gear mechanism is of sturdy construction and is devoid of pawls, ratchets or friction devices which are subjected to rapid wear and require frequent repair and replacement.

Without further elaboration, the foregoing will so fully illustrate my invention, that others may, by applying current knowledge, readily adapt the same for use under various conditions of service.

I claim:

1. In gear mechanism of the type described, the combination of a rotary drive member having a first gear attached thereto, a rotary driven member having a second gear attached thereto, a relatively fixed third gear, a rotatable housing, gear members rotatably carried by said housing, each of said gear members having a fourth gear meshing with said first and third gears and a fifth gear meshing with said second gear, said second and fifth gears having a ratio differing from the ratio of the first and third gears with respect to the fourth gear to impart a relatively slow speed rotation to the driven member reversely of the direction of rotation of said housing.

2. The invention described in claim 1 wherein said drive and driven members each comprises a shaft, spaced and coaxial bearings, a sleeve shaft on said housing rotatable in one of said bearings and having the drive member rotatably supported therein, a sleeve shaft attached to said third gear and fixed to the other bearing, said driven member being rotatably supported in said last-mentioned sleeve, and a second sleeve shaft on said housing rotatably mounted in the other bearing and on the fixed sleeve.

3. In gear mechanism of the character described, a pair of fixedly supported bearings, a housing having aligned hollow trunnions journaled in the bearings, a drive shaft journaled in one of said trunnions, a beveled pinion fixed on said shaft within the housing, a sleeve extended through the housing trunnion in the opposite bearing, said sleeve being fixed to the bearing, a beveled pinion fixed on said sleeve within the housing, a pair of parallel gear wheels in the housing having inwardly facing beveled gears of relatively large diameter engaging the drive and fixed pinions, each of said gear wheels being fixed to the inner end of a support shaft journaled on the housing on an axis perpendicular to the axis of the drive shaft, the respective gear wheels having inwardly facing beveled gears concentric with and of lesser diameter than the first mentioned gears thereof, an output shaft journaled in the fixed sleeve co-axially with the drive shaft, and a pinion fixed on the inner end of the output shaft and in engagement with the smaller diameter gears on the gear wheels.

4. The gear mechanism as claimed in claim 3 wherein the smaller diameter gears of said gear wheels and the output pinion have a ratio differing from that of the larger gears and the drive and fixed pinions.

5. In gear mechanism of the character described, a pair of fixedly supported bearings, a housing having aligned hollow trunnions in the bearings, a drive shaft passing through one of said trunnions, a beveled pinion fixed on said shaft within the housing, a sleeve extended through the housing trunnion in the opposite bearing, said sleeve being fixed to the bearing, a beveled pinion fixed on said sleeve within the housing, a pair of parallel gear wheels in the housing having inwardly facing beveled gears of relatively large diameter engaging the drive and fixed pinions, each of said gear wheels being fixed to the inner end of a support shaft journaled on the housing on an axis perpendicular to the axis of the drive shaft, the respective gear wheels having inwardly facing beveled gears concentric with and of lesser diameter than the first mentioned gears thereof, an output shaft passing through the fixed sleeve co-axially with the drive shaft, and a pinion fixed on the inner end of the output shaft and in engagement with the smaller diameter gears on the gear wheels.

WILLARD M. CASE.